United States Patent [19]

Schlunt

[11] Patent Number: 4,884,232
[45] Date of Patent: Nov. 28, 1989

[54] PARALLEL PROCESSING CIRCUITS FOR HIGH SPEED CALCULATION OF THE DOT PRODUCT OF LARGE DIMENSIONAL VECTORS

[75] Inventor: Richard S. Schlunt, Loma Linda, Calif.

[73] Assignee: General Dynamics Corp., Pomona Div., Pomona, Calif.

[21] Appl. No.: 133,096

[22] Filed: Dec. 14, 1987

[51] Int. Cl.⁴ .................. G06F 15/347; G06F 7/52
[52] U.S. Cl. .................. 364/754; 364/750.5
[58] Field of Search .................. 364/724.01, 724.11, 364/724.12, 724.16, 728.01, 728.03, 728.06, 728.07, 750.5, 754–760

[56] References Cited

U.S. PATENT DOCUMENTS

| | | | |
|---|---|---|---|
| 3,163,749 | 12/1964 | Roth et al. | 235/164 |
| 3,300,626 | 1/1967 | Ling | 364/754 |
| 3,300,627 | 1/1967 | Arden | 364/754 |
| 3,372,269 | 3/1968 | MacSorley et al. | 235/164 |
| 3,670,956 | 6/1972 | Calhoun | 235/164 |
| 3,691,359 | 11/1972 | Dell et al. | 235/164 |
| 3,732,409 | 5/1973 | Fletcher et al. | 364/724.01 |
| 3,752,971 | 8/1973 | Calhoun et al. | 235/164 |
| 3,831,013 | 8/1974 | Alsop et al. | 364/728.06 |
| 3,980,873 | 9/1976 | Mattei | 364/724.12 |
| 4,031,377 | 6/1977 | Deutsch et al. | 235/164 |
| 4,135,249 | 1/1979 | Irwin | 364/758 |
| 4,142,242 | 2/1979 | Duvochel et al. | 364/759 |
| 4,149,259 | 4/1979 | Kowalski | 364/724.12 |
| 4,153,938 | 5/1979 | Ghest et al. | 364/760 |
| 4,369,500 | 1/1983 | Fette | 364/758 |
| 4,392,232 | 7/1983 | Andren et al. | 364/728.06 |
| 4,616,330 | 10/1986 | Betz | 364/750.5 |
| 4,646,327 | 2/1987 | Kojima et al. | 364/750.5 |

FOREIGN PATENT DOCUMENTS 2095067 9/1982 United Kingdom ........... 364/724.16

OTHER PUBLICATIONS

Floyd, "Digital Logic Fundamentals", 1977, Bell & Howell Co., Columbus, Ohio, pp. 388–392.
A. Weinberger, "Multiplier Decoding with Look Ahead", IBM Technical Disclosure Bulletin, vol. 20, No. 9, Feb. 1978, pp. 3591–3593.
T. Jayashree and D. Basu, "On Binary Multiplication Using Quarter Space Algorithm", IEEE Transactions on Computers, Sep. 1976, pp. 957–960.

Primary Examiner—Gary V. Harkcom
Assistant Examiner—Dale M. Shaw
Attorney, Agent, or Firm—Michael H. Jester; Leo R. Carroll

[57] ABSTRACT

A digital circuit executes a parallel algorithm to compute the dot product of large dimensional vectors at very high speed. The circuit may be made of a plurality of cascaded 1-bit correlator chips and a plurality of ALU chips that sum the output of the correlator chips. Alternatively, a general purpose computer architecture for implementing the invention is also provided.

1 Claim, 2 Drawing Sheets

PARALLEL PROCESSING CIRCUITS FOR HIGH SPEED CALCULATION OF THE DOT PRODUCT OF LARGE DIMENSIONAL VECTORS

BACKGROUND OF THE INVENTION

The present invention relates to digital signal processing, and more particularly, to high speed multiplying and adding circuits.

A number of digital signal processing techniques require the summing of a large number of products. Examples are convolutions, discrete Fourier transforms, and transversal filters. Each of these techniques involves sequences of numbers. For example, convolution is used to characterize linear sampled data systems. Convolution of two sequences r and s to obtain a third sequence c is defined as follows:

$$C(n) = (r * s)(n) = \sum_{k=-\infty}^{\infty} r(k)s(k-n) = \sum_{k=-\infty}^{\infty} s(k)r(k-n) \quad (1)$$

In practical applications of Algorithm No. 1, r(k) and s(k) are zero, except for a finite number of terms N. Therefore, in digital processing circuitry for carrying out the convolution, the time required to perform the computation is a function of the size of N.

The discrete Fourier transform of a sequence r, denoted $R(\omega)$, is defined as follows:

$$R(\omega) = \sum_{n=-\infty}^{\infty} r(n)e^{-j\omega n} \quad (2)$$

where $\omega$ is in radians. In practical applications, only a finite number of r(n)'s are non-zero and the sequence r represents samples of a function which is continuous with respect to time. Under these conditions, the discrete Fourier transform gives the frequency context of the samples.

A transversal (non-recursive) filter is a device whose input is a sequence x and whose output is a sequence y given by:

$$y(n) = \sum_{i=0}^{N-1} h(i)x(n-i) \quad (3)$$

Such filters are used to replace analog R-C filters in sampled data systems.

In Formulas 1, 2 and 3 above, it is necessary to compute the dot product of two vectors $A=(a(1),\ldots,a(N))$ and $B=(b(1),\ldots,b(N))$ where:

$$A \cdot B = \sum_{i=1}^{N} a(i)b(i) \quad (4)$$

Conventionally, the dot product of the vectors A and B (Algorithm No. 4) is computed by sequentially multiplying the components of A and B together and adding the same. On a general purpose digital computer this involves programming a loop. The time required to compute the dot product of the vectors A and B is a linear function of the size of N. Substantial computational delays can result if N is large. If the vector B is held fixed in Algorithm No. 4, the computational delay becomes even more pronounced. It would be desirable to provide a digital system for rapidly calculating the dot product of vectors A and B for large values of N.

Heretofore digital systems have been provided for multiplying and adding at high speeds. See for example U.S. Pat. Nos. 4,369,500; 4,153,938; 4,142,242; 4,135,249; 4,031,377; 3,752,971; 3,691,359; 3,670,956; 3,372,269 and 3,163,749. However, all of these patents describe circuits which perform multiple multiplications serially, thereby inherently limiting the speed at which the dot product of large dimensional vectors can be calculated. See also A. Weinberger, "Multiplier Decoding with Look-Ahead", IBM Technical Disclosure Bulletin, Vol. 20, No. 9, February, 1978, pp. 3591–3593 and T. Jayashree and D. Basu, "On Binary Multiplication Using Quarter Square Algorithm", IEEE Transactions on Computers, September, 1976, pp. 957–960.

SUMMARY OF THE INVENTION

It is the primary object of the present invention to provide an improved digital signal processing system for high speed multiplication and addition.

It is another object of the present invention to provide a high speed digital system for calculating the dot product of large dimensional vectors.

It is another object of the present invention to provide an improved digital signal processing system for high speed calculation of convolutions, discrete Fourier transforms, transversal filters and other algorithms involving sequences of numbers.

It is another object of the present invention to provide a digital system for calculating the dot product of vectors in which the processing time is substantially reduced over prior systems which have performed multiple multiplications in serial fashion.

It is another object of the present invention to provide a high speed sum-of-products processor that can readily be implemented with existing integrated circuits.

According to the present invention, a digital circuit executes a parallel algorithm to compute the dot product of large dimensional vectors at very high speed. The circuit may be made of a plurality of cascaded 1-bit correlator chips and a plurality of ALU chips that sum the output of the correlator chips. Alternatively, a general purpose computer architecture for implementing the invention is also provided.

DESCRIPTION OF THE PREFERRED EMBODIMENTS

Figure 1:
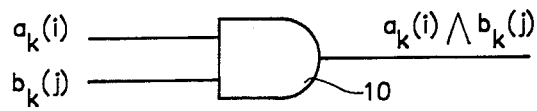
FIG. 1 illustrates the logical operation performed on a bit pair by an AND gate in the first step of the parallel sum-of-products computation performed by my invention.

Arbitrary non-negative integers $A_k$ and $B_k$ smaller than $2^N$ have a binary representation $$A_k = \sum_{i=0}^{N-1} a_k(i)2^i \qquad (5)$$

$$B_k = \sum_{i=0}^{N-1} b_k(i)2^i$$

where each $a_k(i)$ and $b_k(i)$ is a zero or one. Using the above representations, an arbitrary sum of products can be rearranged as follows:

$$\sum_{k=1}^{Q} A_k B_k = \sum_{k=1}^{Q} \left( \sum_{i=0}^{N-1} a_k(i)2^i \right) \left( \sum_{j=0}^{N-1} b_k(j)2^j \right) \qquad (6)$$

$$= \sum_{j=0}^{N-1} 2^j \sum_{i=0}^{N-1} \left( 2^i \sum_{k=1}^{Q} a_k(i)b_k(j) \right) \qquad (7)$$

defining $a(i)$ and $b(j)$ to be the vectors $$a(i) = (a_1(i), a_2(i), \ldots, a_Q(i)) \qquad (8)$$

$$b(j) = (b_1(j), b_2(j), \ldots, b_Q(j))$$

and substituting $a(i)$ and $b(j)$ in (7), we have that $$\sum_{k=1}^{Q} A_k B_k = \sum_{j=0}^{N} 2^j \sum_{i=0}^{N-1} 2^i(a(i) \cdot b(j)) \qquad (9)$$

where "·" is the dot product. Note that $a(i)$ and $b(j)$ are vectors of dimension Q whose components are 0 or 1. Thus $a(i) \cdot b(j)$ is the number of times corresponding components are 1. For example, if $a(i)=(0,1,1,1,0,0,1,0)$ $b(j)=(1,0,1,0,1,1,1,0)$ then $a(i) \cdot b(j)=2$.

For the case Q=1, which is ordinary binary multiplication, $a(i)$ and $b(j)$ are one dimensional vectors. In this particular case, Algorithm No. 9 can be rewritten as $$A_1 B_1 = \sum_{j=0}^{N-1} 2^j \left( b(j) \sum_{i=0}^{N-1} 2^i a(i) \right) = \sum_{j=0}^{N-1} b(j) 2^j A_1 \qquad (10)$$

Algorithm No. 10 is interpreted as follows:

1. If $b(j)=1$, then $A_1$ is shifted j units and added to the previous result.
2. If $b(j)=0$ than $A_1$ is shifted and zero is added to the previous result.

Since $$\sum_{n=0}^{N-1} b(j)2^j$$

is the binary representation of $B_1$, Algorithm No. 11 is just Booth's algorithm for multiplying two binary numbers. See A. D. Booth, "A Signed Binary Multiplication Technique", Q. Jl. Mech. Appl. Math, pp. 236–240, 1951.

For Q greater than one, $a(i) \cdot b(j)$, which in general is not equal to zero or one, is shifted by $2^{i+j}$ and added to the previous result if a binary representation is used for $a(i) \cdot (j)$. Thus a sum of Q products can be computed in $N^2$ steps where N is the number of bits used to digitize the entries involved and is independent of Q which denotes the number of products summed. However, it should be noted that the dimension of the vectors $a(i)$ and $b(j)$ are Q which has some effect on the time required to compute $a(i) \cdot b(j)$.

To further understand Algorithm No. 9, consider the case $B_k=1$ for $k=1, \ldots, Q$. Then $b(j)$, which will be referred to as the $2^j$-bit plane, is the zero vector for $j \neq 0$ or the vector whose components are all one if $j=0$. Thus $a(i) \cdot b(j) = 0$ for $j \neq 0$ and (9) reduces to $$\sum_{k=1}^{Q} A_k = \sum_{j=0}^{N-1} 2^i(a(i) \cdot b(0)) \qquad (12)$$

From Algorithm No. 12, it can be concluded that the sum of Q numbers requires only N steps. Thus to take advantage of (12), one must choose Q larger than the number of bits used in quantization.

So far, only positive integers have been considered for Algorithm No. 9. Because the sums involved are finite, it is always possible to find positive integers X and Y such that $A_k+X$ and $B_k+Y$ are non-negative for all k. It can also be assumed that $A_k+X$ and $B_k+Y$ are less than $2^N$. Expanding, $$\sum_{k=1}^{Q} (A_k + X)(B_k + Y) = \sum_{k=1}^{Q} A_k B_k + X \sum_{k=1}^{Q} (B_k + Y) + \qquad (13)$$

$$Y \sum_{k=1}^{Q} (A_k + X) + XYQ$$

or $$\sum_{k=1}^{Q} A_k B_k = \sum_{k=1}^{Q} (A_k + X)(B_k + Y) - X \sum_{k=1}^{Q} (B_k + Y) - \qquad (14)$$

$$Y \sum_{k=1}^{Q} (A_k + X) - XYQ$$

From Algorithm No. 14, it can be seen that the sum of products involving negative numbers can be reduced to previously considered cases. If X, Y, and Q are chosen as powers of 2, computing Algorithm No. 14 becomes greatly simplified.

Figure 2:
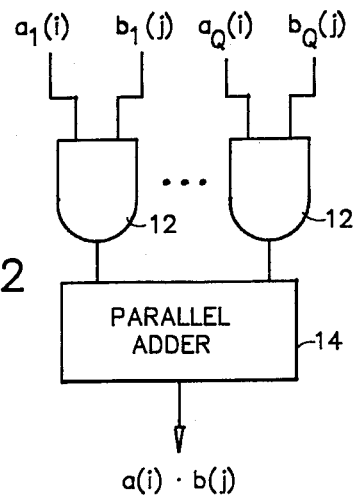
FIG. 2 illustrates the function of a plurality of such AND gates followed by summation in one bit plane in a second step of the computation.

Implementation of Algorithm No. 9 in digital hardware at very fast rates, requires that a means be devised to calculate $a(i) \cdot b(j)$. The multiplication of $a(i) \cdot b(j)$ by $2^{i+j}$ can be accomplished using shift registers. Recalling that $a(i)$ and $b(j)$ represent the $2^i$ and $2^j$ bit planes, whose components are either 0 or 1, it follows that $$a(i) \cdot b(j) = \sum_{k=1}^{Q} a_k(i)b_k(j) = \sum_{k=1}^{Q} a_k(i) \wedge b_k(j) \qquad (15)$$

where $\cap$ represents a logical "AND". FIG. 1 illustrates $a_k(i)$ and $b_k(j)$ being input to AND gate 10 whose output is $a_k(i) \cap (b_k(j)$. The outputs of a plurality of AND gates 12 (FIG. 2) may thus be summed by a parallel adder 14 to obtain $a(i) \cdot b(j)$.

TRW has an integrated circuit correlator chip, denoted TMC 2221, which is commercially available to perform $a(i) \cdot b(j)$ for Q=128. It accepts $a(i)$ and $b(j)$ serially at a 20MHZ rate and outputs a 7-bit word for the dot product. Cascading these chips, allows one to handle Q=128r where r is the number of chips cascaded. Eight of of these chips 16 can be connected as illustrated in FIG. 3 to sum, via adder 18, eight dot products of length 128 to obtain $$\sum_{i=0}^{r} 2^i(a(i)) \cdot b(j))$$

at a 20 MHZ rate. The adder may be made of interconnected ALU chips made by Advanced Micro Devices, such as three Am 25LS381, one Am 25LS2517 and one Am 2902 (look ahead generator). Summing up the output of eight such modules, as shown in FIG. 3, one can obtain $$\sum_{k=1}^{128} A_k B_k,$$

where $A_k$ and $B_k$ are 8 bit words, at a 20 MHZ rate. Used as a transversal filter, the throughput of this circuit is greater than five billion operations per second. Greater throughputs can be obtained by cascading more devices.

Figure 3:
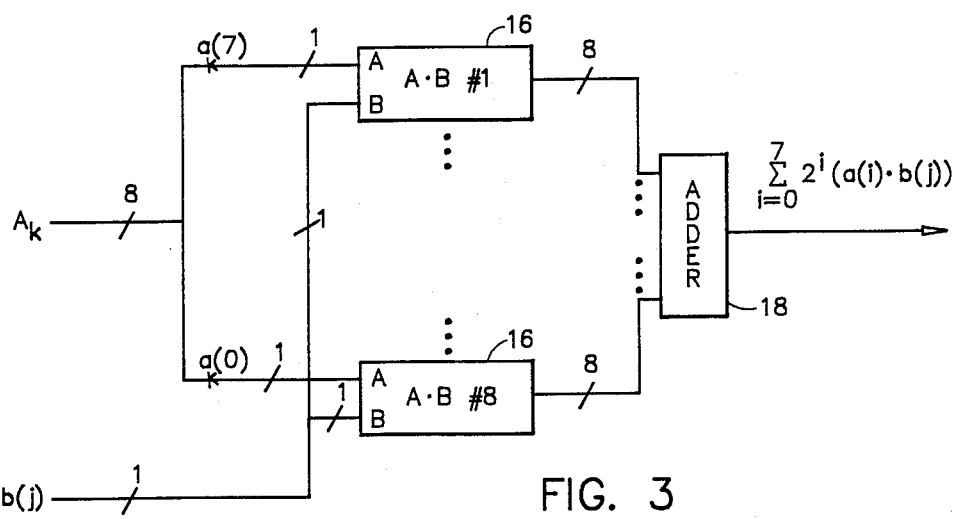
FIG. 3 illustrates a plurality of cascaded correlator chips connected to an adder for performing the parallel sum-of-products computation in accordance with my invention.

The usefulness of the circuit of FIG. 3 can be improved if the B inputs can be loaded in parallel. In this configuration, the discrete Fourier transform can be performed by loading the bit planes of the appropriate coefficients in memory. Thus, a 128 point real transform could be processed in less than 100 microseconds after data has been loaded in the case of the specified TRW chips. Longer transforms could be handled by cascading more chips.

Figure 4:
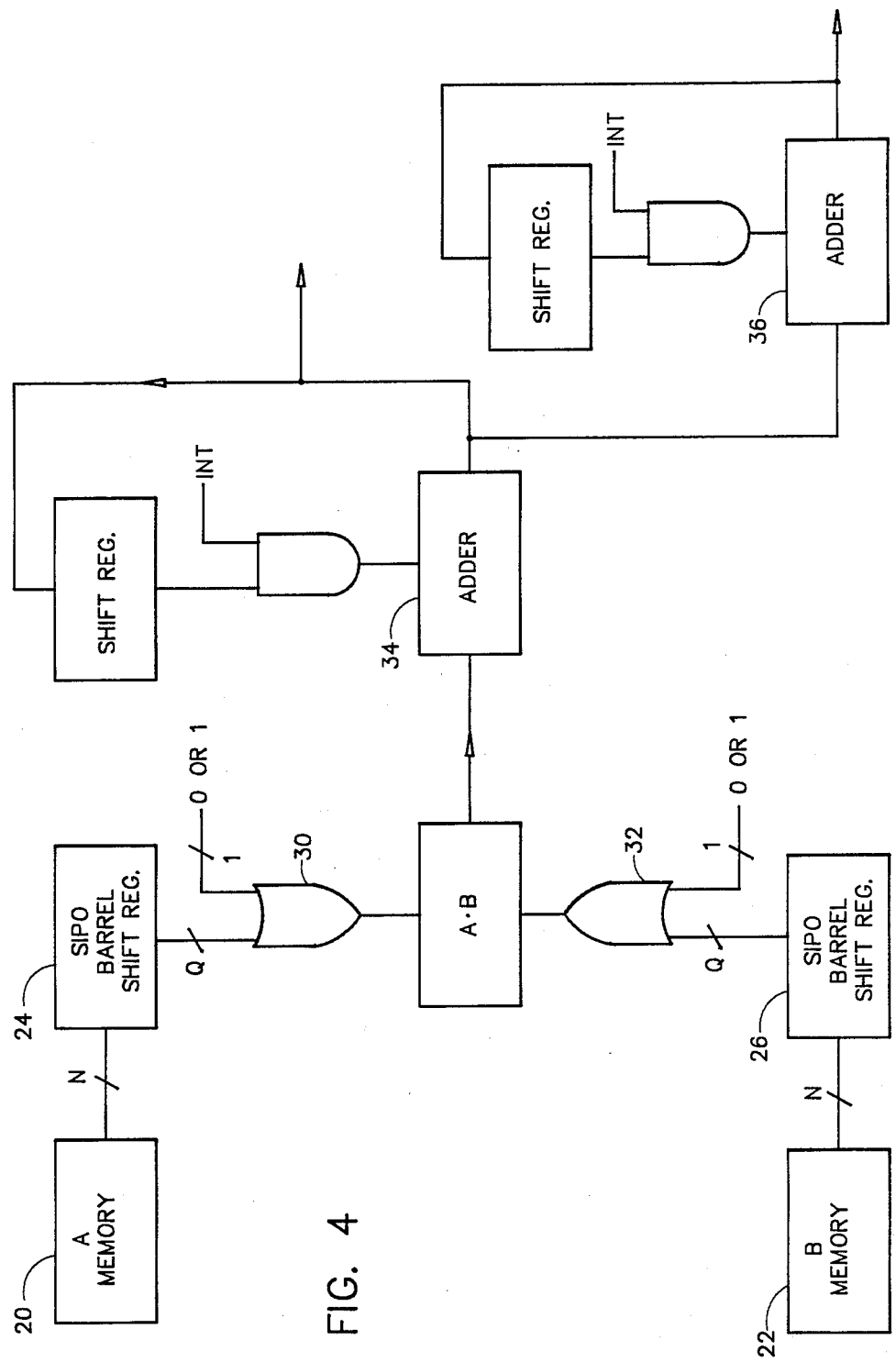
FIG. 4 is a functional block diagram illustrating an architecture for performing the parallel sum-of-products calculation on a general purpose computer.

For general purpose computers, the architecture illustrated in FIG. 4 is more appropriate. Here the $A_k$'s and $B_k$'s are down loaded from memories 20 and 22 into the serial-in-parallel-out (SIPO) barrel shift registers 24 and 26. This effectively creates the bit planes a (0), ... ,a(N−1), b(0), ... ,b(N−1) with b(N−1) and a (N−1) appearing as inputs to the A·B processor 28 when 0 is applied to OR gates 30 and 32. Holding the b(N−1) and rotating through the A bit planes, one obtains $$\left( S(N-1) = \sum_{j=0}^{N-1} 2^j (b(N-1) \cdot a(j)) \right)$$

if the output of adder 34 is shifted each time and initialized at start up. S(N−1) is then sent to adder 36 and added to zero with the output shifted one unit.

With the B bit plane shifted to b(N−2) the above procedure is repeated with $$S(N-2) = \sum_{j=0}^{N-1} 2^j (b(N-2) \cdot a(j))$$

added to 2S(N−1) at adder 36 and shifted. Repeating the above N times gives an output at adder 36 equal to $$2^{N-1}S(N-1) + 2^{N-2}S(N-2) + \ldots + 2S(1) + S(0)$$

which equals $\sum_{i=0}^{N-1} 2^i \sum_{j=0}^{N-1} 2^j (b(i) \cdot a(j)) = \sum_{k=1}^{Q} A_k B_k$ If 1 is applied to the B OR gate 32, then shifting thru the A bit planes gives $$\sum_{k=1}^{Q} A_k.$$

In a similar manner, $$\sum_{k=1}^{Q} B_k$$

can be obtained. Thus, Algorithm No. 14 can be implemented using the architecture illustrated in FIG. 4. Monitoring the bit planes for a zero vector, the speed of computation can be increased by just shifting the appropriate shift register and proceeding.

If individual bit planes of the N bit planes can be updated as they are rotated, the architecture illustrated in FIG. 4 enables the discrete Fourier transform of Q points to be calculated at very fast rates since Q multiplications and Q adds are being done simultaneously. At the same time, the frequency calculated is determined by down loading the appropriate coefficients. This gives flexibility not obtainable before at speeds approaching optical processors. The architecture illustrated in FIG. 4, with appropriate controls, can perform the basic digital signal processing algorithms such as convolution, discrete Fourier transform and transversal filtering handling positive and negative numbers.

I claim:
1. A circuit for calculating a(i)·b(j) where a(i) is the vector $(a_1(i), a_2(i) \ldots ,a_Q(i))$, b(j) is the vector $(b_1(j), b_2(j), \ldots b_Q(j))$, each $a_k(i)$ is a zero or a one, and each $b_k(i)$ is a zero or a one, comprising:
  first memory means for storing digital signals representing a(i);
  second memory means for storing digital signals representing b(j);
  a first serial-in-parallel-out barrel shift register for creating the bit planes a(o), ... ,a(N−1) from the digital signals stored in the first memory means;
  a second serial-in-parallel-out barrel shift register for creating the bit planes b(o), ... ,b(N−1) from the digital signals stored in the second memory means;
  a first OR gate having a first input connected to the first serial-in-parallel-out barrel shift register;
  a second OR gate having a first input connected to the second serial-in-parallel-out barrel shift register;
  means for applying a zero or a one to a second input of each of the OR gates;
  a correlator connected to an output of the first OR gate and an output of the second OR gate; and
  mean connected to the correlator for summing a plurality of successive outputs of the correlator.

* * * * *

UNITED STATES PATENT AND TRADEMARK OFFICE
CERTIFICATE OF CORRECTION

PATENT NO. : 4,884,232
DATED : November 28, 1989
INVENTOR(S) : Richard S. Schlunt It is certified that error appears in the above-identified patent and that said Letters Patent is hereby corrected as shown below:

In Claim 1, column 6, line 59, delete "mean" and insert therefor --means--.

Signed and Sealed this

Twenty-eighth Day of January, 1992

Attest:

HARRY F. MANBECK, JR.

*Attesting Officer*  *Commissioner of Patents and Trademarks*